United States Patent [19]

Gordin

[11] Patent Number: 5,199,181

[45] Date of Patent: Apr. 6, 1993

[54] ELECTRIC MOTOR BRUSH ALIGNMENT TOOL

[75] Inventor: Patrick D. Gordin, Oskaloosa, Iowa

[73] Assignee: S & K Racing Products, Inc., Oskaloosa, Iowa

[21] Appl. No.: 839,312

[22] Filed: Feb. 20, 1992

[51] Int. Cl.[5] ............................................. G01D 21/00
[52] U.S. Cl. ...................................... 33/645; 33/656; 33/811
[58] Field of Search ................. 33/656, 655, 644, 695, 33/613, 810, 811, 812, 821, 823, 824, 610, 600

[56] References Cited

U.S. PATENT DOCUMENTS 1,818,853  8/1931  Joriot ..................................... 33/823
3,181,244  5/1965  Sosa ....................................... 33/811

Primary Examiner—Harry N. Haroian
Attorney, Agent, or Firm—Zarley, McKee, Thomte, Voorhees, & Sease

[57] ABSTRACT

An electric motor brush alignment tool for aligning brushes to 180° orientation from each other, for motors having brush holding brackets which include hollow channels. The brushes are positioned at inner ends of the hollow channels. The tool includes pin members connected to jaws that can be translated relative to one another; to the jaws are connected to a base. The base provides guidance and support from the jaws which allow translation of the pin members into the brush holding brackets. The jaws are then secured to the base which presents the pins in 180° rigid alignment to in turn provide alignment of the brush holding brackets.

5 Claims, 2 Drawing Sheets

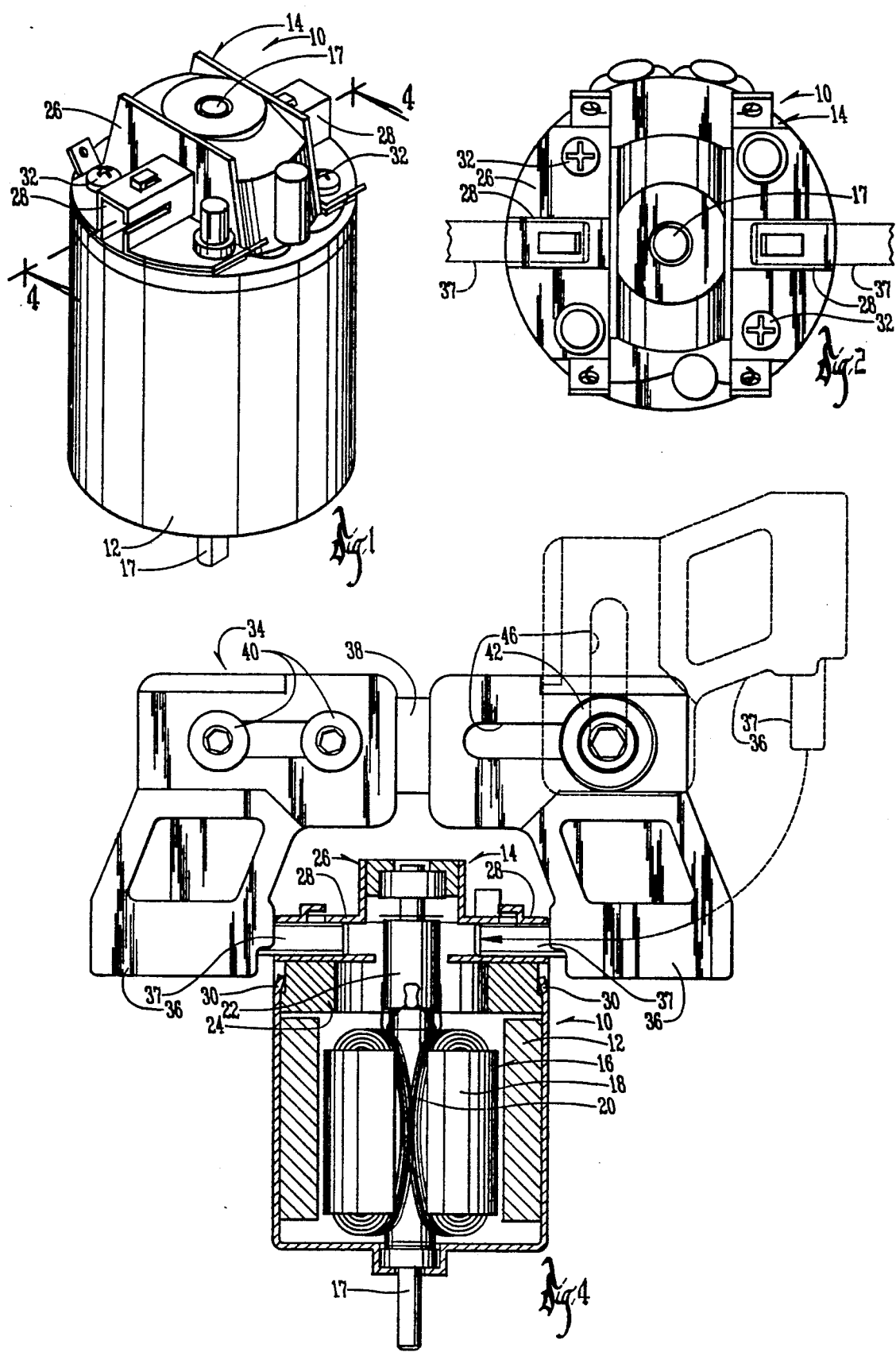

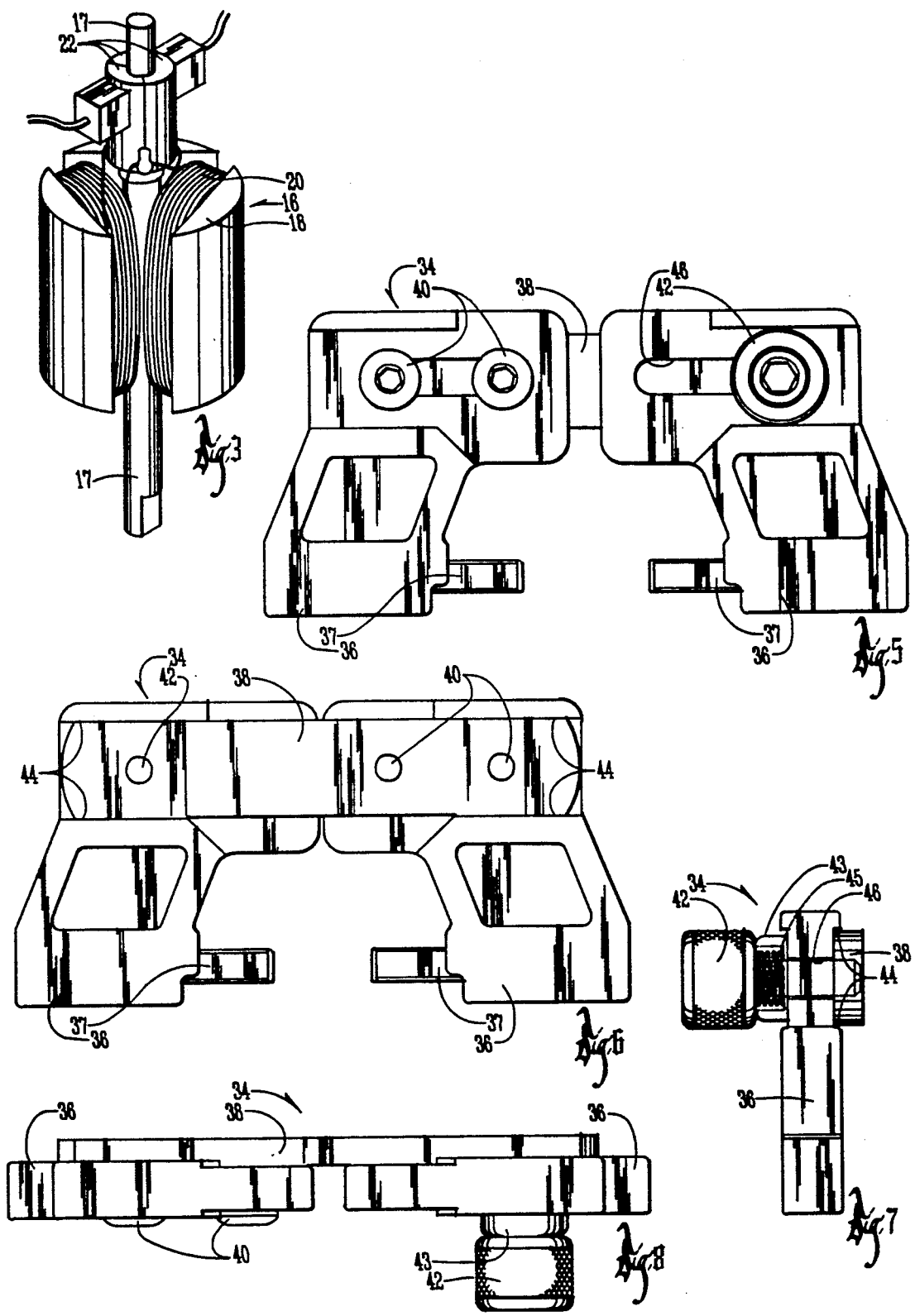

ELECTRIC MOTOR BRUSH ALIGNMENT TOOL

BACKGROUND OF THE INVENTION

A. Field of the Invention

This invention pertains to the alignment of brushes in electric motors, and in particular, to brushes on relatively small sized electric motors where the brushes are retained in brush holding brackets.

B. Problems in the Art

Direct current (DC) electric motors take many shapes and forms. They can also be constructed to be of a wide variety of sizes and a wide variety of power ratings.

DC electric motors transfer electrical power from the DC power source into mechanical power by utilizing well known principles associated with electric motors.

Many commercially used relatively small electric motors have the following construction. The motor housing encloses the stator comprised of at least two magnets of opposite polarities. The polarity of the magnets creates a magnetic field B in the motor housing. A rotor containing an armature core with a center shaft or axle extends longitudinally through the stator. The armature core is wound in a predetermined pattern forming an armature winding.

Many times the construction of these small motors has one end of the axle extending out of the housing to form the drive end of the motor. The other end of the axle extends out the other end of the housing and has two or more spaced apart conducting segments positioned radially around that axle end. These segments are called commutator segments. One end of the armature winding is attached to one of the commutator segments, and the other end of the winding is attached to another segment.

Electric power in these motors is conveyed to the commutator segments by brushes. Normally, brushes are conducting material positioned adjacent to the rotational commutator segments so that the brushes conductively touch the segments.

To enable access to the brushes, and maintenance and replacement of the brushes, many times they are positioned in brush holding brackets. These brackets are generally at least somewhat adjustable or removable for this purpose. Brushes are, of course, connected to the direct current power supply. Contact to the brushes is the only electrical contact the rotor makes with the power source. By virtue of the law of physics $F=iIxB$, the rotor experiences an electromagnetic force causing the rotor to turn within the stator to create the mechanical rotational power.

Many of these types of motors utilize an arrangement where the brushes are positioned 180° apart from one another. Commutator segments may either be two in number, or could be three or more in number.

It has been found that the most efficient transfer of electrical energy between the brushes and the commutator segments is when the brushes are precisely aligned with another. For example, if the brushes are supposed to be 180° apart from one another, to obtain the most efficient operation and most power from the motor, it is generally best to precisely ensure that they are in such an alignment.

The present invention pertains primarily to those electric motors which have brush holding brackets generally 180° apart and which either are somewhat adjustable or have some play in them. In this case, for any number of reasons, the brush holding brackets, and therefore the brushes, may not be precisely aligned, thereby presenting the efficiency and power problem discussed above.

It is therefore desirable to have an easy, reliable and precise way to align the brush holders or realign the brush holders into precise alignment.

A specific example will help point out the value of such a tool. In radio controlled scale-model race cars, electric motors are utilized that have brush holding brackets of the type previously described. Each bracket is within a framework which can be pivoted on the housing to allow access to the brushes. However, because of this construction and the inevitable manufacturing tolerances, there is generally some play in the final positioning of the brush holders when tightened down for operation of the motor.

Whether one is operating the car competitively or not, any misalignment caused by inaccurate positioning, or other reasons, can hurt the operation of the motor. Particularly in competitive situations, this decrease in motor operation can be significant enough to require realignment of the brush holders.

There is, therefore, a real need in the art for a means and method for quickly, easily, and reliably aligning such brush holders.

It is therefore a primary object of the present invention to provide an electric motor brush alignment tool which allows for easy, quick, reliable and accurate alignment of brush holders.

Another object of the present invention is to provide a tool as above described which is simple to operate, has a minimum number of parts, but is flexible in its use.

Another object of the present invention is to provide a tool as above described which is economical and durable.

These and other objects, features and advantages of the present invention will become more apparent with reference to the accompanying specification and claims.

SUMMARY OF THE INVENTION

The present invention is an electric motor brush alignment tool. The tool is adapted to accurately align brush holding brackets for the motor.

The tool consists of two pins which matingly fit into the outer ends of the brush holding brackets. The pins are attached to arm members which attach to or are integral with an alignment base member. The arm members and the alignment base member allow the pins to be moved relative to one another between a first position where the pins are inserted in the brush holding brackets and are rigidly secured along an axis, to a second position where the pins are moved away from one another to allow the pins to be removed from the brush holding brackets and the tool then removed from the motor.

The alignment base member includes a manually operable means for locking the members into any orientation with respect to one another between the first position and the second position. The tool, therefore, can provide a very accurate, rigid and reliable alignment tool yet at the same time can be easily released from position to allow quick and easy alignment of the brush holders.

BRIEF DESCRIPTION OF THE DRAWINGS

FIG. 1 is a perspective view of an electric motor.

FIG. 2 is a top plan view of FIG. 1, also showing the position of arms associated with the invention as positioned inserted in the motor.

FIG. 3 is an isolated perspective view of the rotor of the motor of FIG. 1, also showing the position of brushes to the commutator of the rotor.

FIG. 4 is a sectional view taken along line 4—4 of FIG. 1 including a front elevational view of a brush alignment tool according to the invention.

FIG. 5 is an isolated front elevational view of the tool of FIG. 4.

FIG. 6 is a back elevational view of the tool of FIG. 5.

FIG. 7 is an end elevational view of FIG. 6.

FIG. 8 is a top plan view of FIG. 6.

DETAILED DESCRIPTION OF THE PREFERRED EMBODIMENT

In the drawings of FIG. 1, the reference numeral 10 generally designates an electric motor. The electric motor 10 includes a stator 12 (see FIG. 4), stator cap 14, and a rotor 16 with its shaft 17 extended longitudinally through motor 10 outside the center point of the stator bottom. The rotor 16 includes an armature core 18. The exposed wires wrapped around the armature core are armature winding 20. On the top of shaft 17 of the rotor 16 are three commutator segments 22. The segments are of equal size radially positioned about and encircling shaft 17. They are insulated and separated from one another by a slit or air gap every 120 degrees. Under normal operation, the rotor is housed within the stator cap 14.

By referring to FIG. 4, it can be seen that the stator cap 14 is comprised of three main portions. The bottom portion is made of an insulated material molded to snugly fit over the stator, with a top chamber area to house the commutator segments and a hole on the chamber top to accommodate the rotor shaft. Another portion 26 is comprised of two symmetric pieces made of a metallic material molded to fit on top of the bottom layer 24 and both sides of the chamber walls. The top layer 28 is comprised of two symmetric pieces each made of a metallic material with a square channel to accommodate motor brushes. The top and middle layers are secured to the bottom layer by two metallic tabs 30 and two screws 32 protruding through the drilled screw holes of the top and middle metallic layers into the non-metallic bottom layer.

In the drawings, FIGS. 4-8, the reference numeral 34 refers to an electric motor brush alignment tool. The tool is comprised of two alignment arms 36, a guidance bar 38, two fixation screws 40 and an adjustment screw 42. The alignment arms each include a metal pin 37 with flat sides and rounded tops and bottoms. The alignment arms 36 also include recessed tracks 44 (see FIGS. 5 and 6) and guidance tracks 46 (see FIGS. 4 and 5) to allow the arms to receive the guidance bar 38. Once the right arm piece is fully extended, the entire arm can be swung 90 degrees upward as routed by guidance tracks 46.

The electric motor alignment tool 34 is used to insure the square brush channels 28 are aligned in an 180 degree straight line. The alignment is done in corroboration with square channels 28 before screws 32 but after metallic tabs 30 are installed on the bottom non-metallic layer 24. After the metallic tabs 30 are installed, the square brush chamber 28 should be secured on the bottom layer 24. However, channels 28 are still rotatable about taps 30. Screwing the screws into the pre-drilled holes on 24, 26 and 28 would not insure that the chambers 28 are aligned along a straight line since the pre-drilled holes permit slight variations.

To use the electric motor brush alignment tool, one needs to at least partially unscrew the adjustable screw 42; pull the arms away from each other to the fullest extent possible and swing the right hand arm 90 degrees upward as shown in FIG. 4. One then would insert the left arm pin horizontally into the left hand square channel 28 and swing the right hand arm back to its horizontal position. The right arm pin would then be slid horizontally along the guidance bar 38 to the left until the right arm pin is fully inserted into the right side square channel. The adjustable screw 42 would then be tightened to secure the 180° aligned position as shown in FIG. 4. Finally, screws 32 would be tightened into the bottom layer 24 and the square channels should be aligned to an 180° degree straight line. The stability of the right alignment arm 36 would be maintained when the adjustable screw 42 was loosened by a ballast spring 43 and washer 45 placed between the alignment arm 36 and the adjustable screw 42 as shown in FIG. 7.

This is one embodiment in which the alignment tool may be implemented. This description by no means limits the current teaching to this particular configuration only. The true spirit and principle of this teaching may be implemented in many other forms. The scope of this invention is set forth in the appended claims.

The tool can also be used as a tolerance gauge. By pinching the hood or cap 14, and particularly the brush-holding channels 28, with pliers and inserting the tool into the brush channels 28 you can set the tolerances of the brushes to prevent side to side movement of the brushes which insures brush fit and a higher performance motor.

What is claimed is:

1. In combination with an electric motor having brush holding brackets positioned generally along an axis on opposite sides of a rotor of the electric motor, and an electric motor brush alignment tool, comprising:
    first and second pin means for insertion into the brush holding brackets, the brush holding brackets having an inner cross-sectional dimension and the first and second pin means having an outer cross-sectional dimension which closely conforms to the inner cross-sectional dimension of the brush holding brackets; and
    alignment means to which are connected the first and second pin means for adjustably bringing the first and second pin means into the brush holding brackets while maintaining the first and second pin means along the axis so that the brush holding brackets will be aligned along the axis.

2. A brush alignment tool means for accurately aligning brush holding brackets of an electric motor 180° from one another to improve the performance of the motor comprising:
    a bar means elongated along an axis and having opposite ends;
    a first jaw means mounted towards an opposite end of the bar means and having an arm means extending away from the bar means;
    a second jaw means mounted towards the other opposite end of the bar means and having an arm means extending away from the bar means;
    a first pin means mounted in a fixed relation to one of said first and second means and extending inwardly along an axis generally parallel to the axis of the bar means;

a second pin means mounted in a fixed relation to the other of said first and second jaw means;

translation means for allowing movement of the other of said first and second jaw means between an alignment position and a removed position;

the alignment position presenting the second pin means in an inwardly extending position coaxial with the first pin means; and so that the first and second pin means can be inserted in said brush holding brackets and align the brackets 180° from one another along the axis.

3. A tool for aligning brush holding brackets of an electric motor, where the brackets include elongated channels generally in 180° alignment along an axis on opposite sides of a commutator and having inner ends adapted to receive electric brushes and outer open ends defining entry to the channels for each bracket, each bracket having some play which can cause them to become misaligned from the axis, comprising: a base means;

opposed jaw means terminating in pin means, said jaw means mounted on the base means;

guidance means on at least one of the jaw means cooperating with the base means for prohibiting converging movement of the pin means closer than a distance which is less than a distance between outer open ends but greater than a distance between inner ends of the brackets; and for allowing movement of the pin means towards a position where the pin means are aligned along an axis and spaced generally a distance that would allow insertion and retention in the brackets, the pin means having a size which closely conforms with the size of the channels.

4. A brush alignment tool means for aligning brush holding brackets of an electric motor 180° generally along an axis from one another comprising:

a base means comprising an elongated rigid bar means;

first and second pin means for insertion into the brackets;

arm means extending between the base means and each pin means, each pin means mounted in a fixed relation to a corresponding arm means, one of the arm means fixedly mounted towards a first end of the base means, said arm means comprising jaw means which are generally mirror images of one another;

translation means associated with the other arm means for varying the position and orientation of its corresponding pin means with respect to the pin means of the one arm means;

the translation means including a first guide means on the other arm means for guiding movement of the other arm means linearly along the base means between a position of closest convergence on both pin means and a second position where both pin means are spaced apart a greater distance, and a second guide means on the other arm means for guiding movement of the other arm means rotationally around a pivot point positioned towards a second end of the base means to allow pivoting movement of the pin means of the other arm means away from the axis and farther away from the one arm means.

5. A method of aligning brushes for an electric motor, where the brushes are held in inner ends of brush holding brackets which have linear channels extending oppositely and outwardly generally along an axis to outer open ends and where the brackets are removable securable to the motor and have at least some angular play with respect to the axis comprising:

loosening the brackets from rigid securement to the motor;

bringing elongated pin means through the outer open ends and at least a portion of the way into the channels of the brackets;

locking the pin means in position at least a portion of the way into the channels of the brackets in a 180° relationship to one another along the axis to bring the channels of the brackets into 180° relationship to one another along the axis;

rigidly securing the brackets in place; and removing the pin means from the brackets.

* * * * *